United States Patent
Coon et al.

(10) Patent No.: US 9,048,887 B2
(45) Date of Patent: Jun. 2, 2015

(54) WIRELESS COMMUNICATION METHODS AND APPARATUS

(71) Applicant: KABUSHIKI KAISHA TOSHIBA, Tokyo (JP)

(72) Inventors: Justin Coon, Bristol (GB); Sema Dumanli Oktar, Bristol (GB)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/868,458

(22) Filed: Apr. 23, 2013

(65) Prior Publication Data

US 2013/0287133 A1     Oct. 31, 2013

(30) Foreign Application Priority Data

Apr. 25, 2012   (GB) .................................. 1207255.9

(51) Int. Cl.
*H04B 7/04*     (2006.01)
*H04B 7/06*     (2006.01)

(52) U.S. Cl.
CPC ................ *H04B 7/04* (2013.01); *H04B 7/0608* (2013.01)

(58) Field of Classification Search
CPC .... H04B 7/061; H04B 7/0634; H04B 7/0671; H04B 7/0689; H04B 7/0691; H04B 7/086; H04B 7/04; H04B 7/0608; H01Q 19/005; H01Q 3/2605; H01Q 9/045; H04W 52/42
USPC .................. 375/295, 309, 315, 316, 340, 259
See application file for complete search history.

(56) References Cited

U.S. PATENT DOCUMENTS

| | | | |
|---|---|---|---|
| 5,886,987 A * | 3/1999 | Yoshida et al. ............... | 370/318 |
| 8,428,168 B1 * | 4/2013 | Zhang et al. ................... | 375/267 |
| 2002/0094783 A1 | 7/2002 | Chau et al. | |
| 2005/0009475 A1 * | 1/2005 | Hwang ......................... | 455/100 |
| 2008/0037673 A1 | 2/2008 | Ahn et al. | |
| 2010/0208771 A1 | 8/2010 | Uhl et al. | |

FOREIGN PATENT DOCUMENTS

| | | |
|---|---|---|
| CN | 101609931 A | 12/2009 |
| JP | 2007-214780 | 8/2007 |
| JP | 2008-17098 | 1/2008 |
| JP | 2009-253703 | 10/2009 |
| WO | WO 2007/024214 A1 | 3/2007 |

OTHER PUBLICATIONS

Raed Y. Mesleh, et al., "Spatial Modulation," IEEE Transactions on Vehicular Technology, vol. 57, No. 4, Jul. 2008, pp. 2228-2241.
Aydin Babakhani, et al., "Near-Field Direct Antenna Modulation," IEEE Microwave Magazine, vol. 10, No. 1, Feb. 2009, pp. 36-46.
Office Action issued May 20, 2014 in Japanese Patent Application No. 2013-092038 (with English translation).
Office Action issued Jan. 20, 2015 in Japanese Patent Application No. 2013-092038 (with English translation).

* cited by examiner

*Primary Examiner* — Vineeta Panwalkar
(74) *Attorney, Agent, or Firm* — Oblon, McClelland, Maier & Neustadt, L.L.P.

(57) ABSTRACT

In one embodiment, a method, in a wireless network, of transmitting a sequence of bits of information from an array of antennas, the array of antennas comprising a plurality of antennas, each antenna of the plurality of antennas having a plurality of feed points, comprises selecting an antenna and at least one feed point of the plurality of feed points for the selected antenna from a plurality of combinations of antenna and at least one feed point to indicate at least part of the sequence of bits; and transmitting a signal from the selected antenna by driving the selected at least one feed point.

14 Claims, 7 Drawing Sheets

WIRELESS COMMUNICATION METHODS AND APPARATUS

CROSS REFERENCE TO RELATED APPLICATION

This application is based upon and claims the benefit of priority of United Kingdom Patent application no. GB1207255.9 filed on 25 Apr. 2012; the entire contents of which are incorporated herein by reference.

FIELD

Embodiments described herein relate generally to spatial signalling schemes in wireless communications systems.

BACKGROUND

Spatial signalling schemes, such as 'spatial modulation' and 'space-shift keying' encode data onto the spatial signature of the channel. This is done through the selection of one or a plurality of antennas according to the data bits that are to be conveyed to an intended receiver.

In a spatial modulation scheme, part of the information to be transmitted is encoded by using a modulation technique such as Binary Phase Shift Keying (BPSK) modulation. The remaining part is used to specify which antenna of an array of antennas the BPSK symbol representing the first part is transmitted.

Space-shift keying is performed in an identical manner, but information is only conveyed using the channel signatures of the antennas, i.e., modulation schemes like BPSK are not used.

BRIEF DESCRIPTION OF THE DRAWINGS

In the following, embodiments will be described with reference to the accompanying drawings in which.

DETAILED DESCRIPTION

Figure 1:
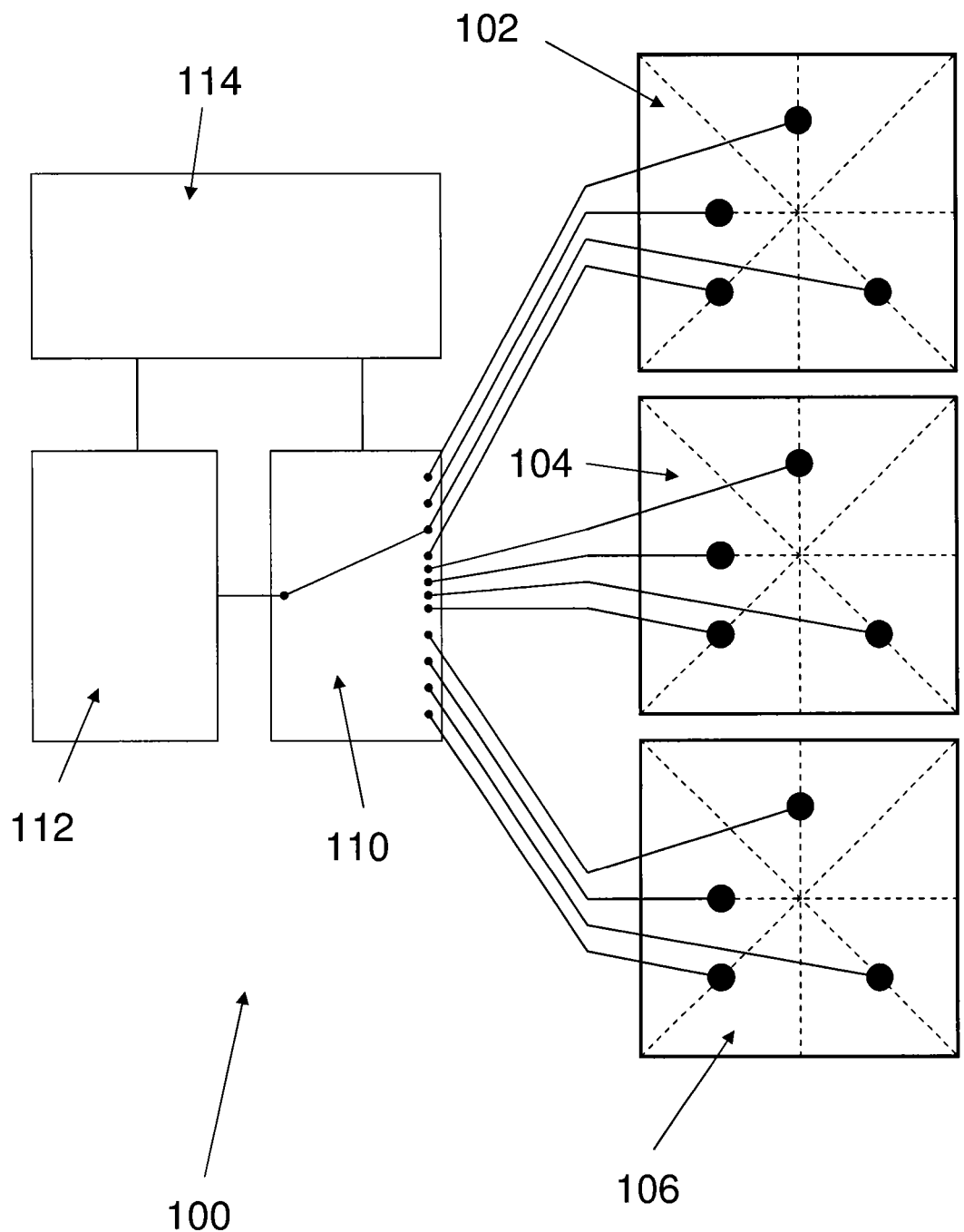
FIG. 1 shows a transmitter according to an embodiment.

In one embodiment, a method, in a wireless network, of transmitting a sequence of bits of information from an array of antennas, the array of antennas comprising a plurality of antennas, each antenna of the plurality of antennas having a plurality of feed points, comprises selecting an antenna and at least one feed point of the plurality of feed points for the selected antenna from a plurality of combinations of antenna and at least one feed point to indicate at least part of the sequence of bits; and transmitting a signal from the selected antenna by driving the selected at least one feed point.

In an embodiment, driving the selected at least one feed point causes the antenna to transmit a signal having a characteristic channel signature.

In an embodiment, driving the selected at least one feed point causes the antenna to transmit a signal having a characteristic polarisation.

In an embodiment, the method further comprises selecting the plurality of combinations of antenna and at least one feed point.

In an embodiment, the plurality of combinations of antenna and at least one feed point are selected based on channel state information.

In an embodiment, the method further comprises receiving an indication of an error rate from a receiver and changing the plurality of combinations of antenna and at least one feed point.

In an embodiment, the method further comprises determining from the indication of the error rate if there is a correlation between channel transfer functions for combinations of antenna and operating mode in the plurality of combinations of antenna and at least one feed point.

In an embodiment, the plurality of combinations of antenna and at least one feed point comprises a single feed point or a single combination of feed points for each antenna.

In an embodiment, the sequence of bits of information comprises a first part and a second part and the method further comprises selecting the selected antenna and the selected at least one feed point to indicate the first part of the sequence of bits, and wherein the signal transmitted from the selected antenna using the at least one feed point depends on the second part.

In one embodiment a transmitter comprises an array of antennas, the array of antennas comprising a plurality of antennas, each antenna of the plurality of antennas having a plurality of feed points; a selector configured to select an antenna and at least one feed point for the selected antenna; a driver configured to drive the selected at least one feed point of the selected antenna with a drive signal; and a modulator configured to control the selector such that the selected combination of antenna and at least one feed point indicates at least part of a sequence of bits to be transmitted.

In an embodiment, the antennas of the plurality of antennas are patch antennas.

In an embodiment, each antenna is configured such that driving a selected feed point or selected combination of feed points causes the antenna to generate an output signal having a characteristic polarisation.

In one embodiment, a method of receiving a sequence of bits of information in a wireless network, comprises receiving a signal; estimating an antenna from an array of antennas from which the signal was transmitted and estimating at least one feed point of the estimated antenna from which the signal was transmitted; and using the estimated antenna and the estimated at least one feed point to determine at least part of the sequence of bits.

In one embodiment a receiver for a wireless network comprises at least one antenna, the at least one antenna configured to receive signals having a plurality of channel signatures, the plurality of channel signatures corresponding to different antennas of an array of antennas and different feed points of the antennas of the array of antennas; and a demodulator configured to determine an indication of an antenna and feed point for a signal received and to use the indication of the antenna and the feed point to determine at least part of a sequence of bits transmitted from the array of antennas.

In one embodiment, a system comprises a transmitter and a receiver according to embodiments, wherein the modulator of the transmitter is configured to select combinations of antenna and at least one feed point from a plurality of combinations, wherein the transmitter and the receiver are configured to dynamically determine the plurality of combinations to reduce correlations in channel signatures between the combinations of antenna and feed points in the plurality of combinations.

Embodiments provide computer program products comprising computer executable instructions which, when executed by a computer, cause the computer to perform a method as set out above. The computer program products may be embodied in a carrier medium, which may be a storage medium or a signal medium. A storage medium may include optical storage means, or magnetic storage means, or electronic storage means.

The described embodiments can be incorporated into a specific hardware device, a general purpose device configure by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

FIG. 1 shows a transmitter 100 according to an embodiment. The transmitter 100 has an array of antennas which comprises a first antenna 102, and second antenna 104 and a third antenna 106. Each of the antennas has four feed points.

The transmitter 100 has a selector 110. The selector 110 can select one of the feed points of one of the three antennas. The transmitter 100 has a driver 112 which produces a drive signal. The selector 110 selects an antenna and a drive point to be driven by the drive signal generated by the driver 112. The transmitter 100 further comprises a modulator 114 which controls the driver 112 and the selector 110.

In use, the modulator 114 causes the selector 110 to select an antenna and a feed point for the selected antenna and causes the driver 112 to supply a drive signal to the selected feed point of the selected antenna.

Figure 2:
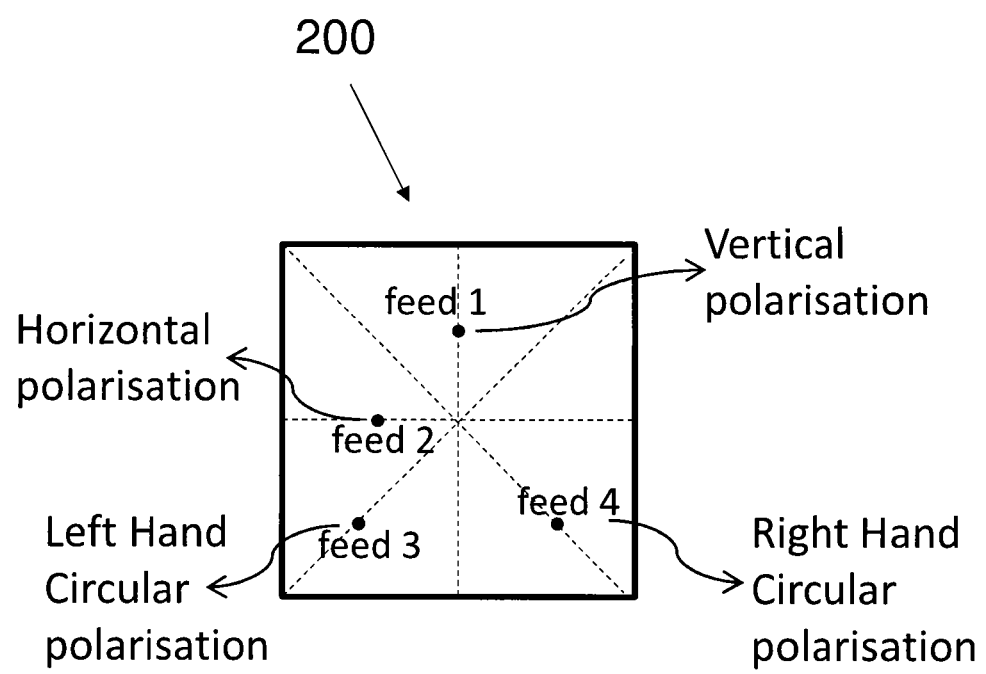
FIG. 2 shows an antenna of an embodiment.

FIG. 2 shows one of the first antenna 102, the second antenna 104 and the third antenna 106. The antenna 200 is a microstrip patch antenna. The antenna 200 has four feed points. If the antenna 200 is driven at a feed point feed 1 a signal having a vertical polarisation will be output. If the antenna 200 is driven at feed point feed 2 an output signal having a horizontal polarisation will be output. If the antenna 200 is driven at a feed point feed 3, an output signal having a left-hand circular polarisation will be output. If the antenna is driven at a feed point feed 4, a right-hand circular polarisation output signal will be output.

Therefore, the transmitter shown in FIG. 1 can control which antenna of the array of antennas outputs a signal and also the polarisation of the signal output from the selected antenna.

Embodiments therefore allow channel signatures to be defined by spatial selection of an antenna from the array of antennas and also by selection of the feed point for the selected antenna. Therefore, embodiments of the present invention have an increased spectral efficiency.

In an embodiment, the system shown in FIG. 1 is used to transmit a sequence of bits of information. The modulator 114 selects and antenna and a feed point based on part of the sequence of bits of information. The modulator further causes the driver 112 to generate a drive signal based on a second part of the sequence of bits of information. Therefore, the transmitted signal and the combination of antenna and feed point from which the transmitted signal is transmitted both carry information.

In a further embodiment, the selection of the antenna and the feed point may carry all of the information to be transmitted.

In an embodiment, a selection of feed points and antennas from the complete set of all possible combinations of feed points and antennas may be used to transmit information.

Figure 3:
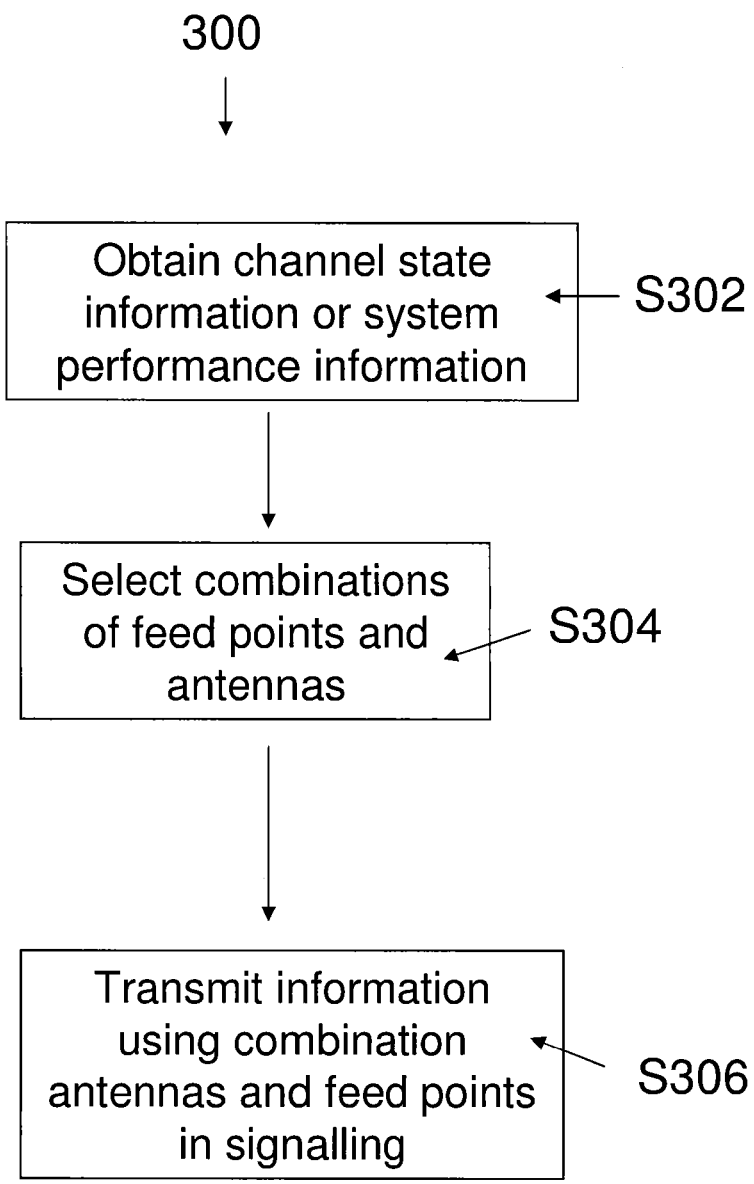
FIG. 3 shows a method of transmitting a signal according to an embodiment.

FIG. 3 shows a method 300 of transmitting information according to an embodiment of the present invention. In step S302, channel state information or system performance information is obtained. This may be done at the receiver, and the receiver may determine which combinations of feed points and antennas can be differentiated with minimized error. In step S304, combinations of feed points and antennas for sending information are selected. In step S304, therefore a set of combinations which can be reliably distinguished is selected so that the error rate at a receiver is minimized. Then, in step S306, information is transmitted using the combinations of feed points and antennas selected in step S304. As described above, the information may be partially encoded on the selection of antennas and feed points or alternatively may be completely encoded on the selection of antennas and feed points.

Figure 4:
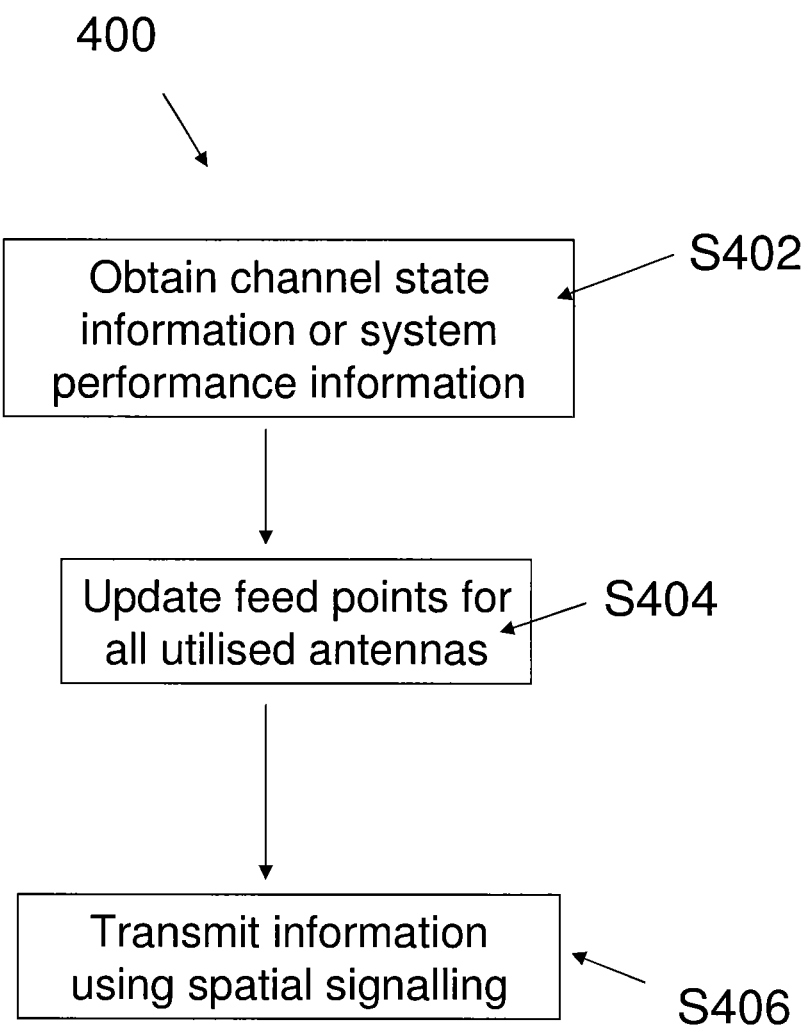
FIG. 4 shows a method of transmitting a signal according to an embodiment.

FIG. 4 shows a method 400 of transmitting information according to an embodiment of the present invention. The method 400 is based on a spatial signalling scheme. This may either be a so-called spatial modulation scheme or a space shift keying scheme. In the method 400, information is carried by the spatial selection of antennas, but not carried by the selection of specific feed points for the antennas. Rather, the feed points are selected such that the receiver can reliably distinguish between channels defined by a spatial selection of an antenna. In step S402, the receiver obtains channel state information or system performance information. This information may for example indicate correlations between physical channel transfer functions.

In step S404, a selection of feed points for all the utilised antennas is updated. Then, in step S406, information is transmitted using spatial signalling.

Figure 5:
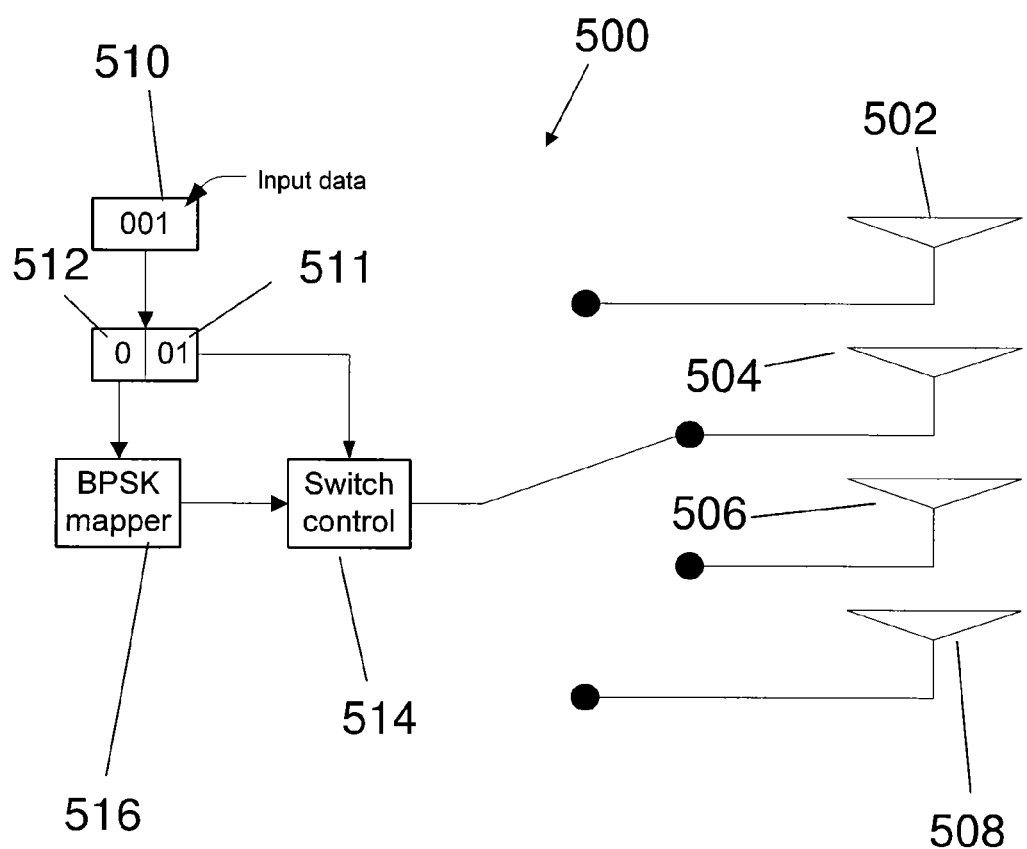
FIG. 5 shows a transmitter according to an embodiment.

FIG. 5 shows a transmitter 500 according to an embodiment of the present invention which uses the method described above in relation to FIG. 4. The transmitter 500 comprises four antennas 502, 504, 506 and 508. Each of the antennas has a number of feed points as described in relation to FIG. 2 above. Input data 510 for transmission is divided into a spatial signalling part 511 and a binary phase shift keying (BPSK) part 512. The space shift keying part 511 is used to control a switch control 514 which selects one of the antennas. A binary phase shift keying mapper 516 generates a signal using the binary phase shift keying part 512. Thus, the input data 510 is encoded on a selection of an antenna in this case antenna 504 and also partially encoded on binary phase shift keying information which is transmitted from the selected antenna. In the embodiment shown in FIG. 5, the key points for the antennas 502, 504, 506 and 508 are selected from among the possible feed points for the antennas in order to allow a receiver to reliably distinguish between the antennas. Therefore, this embodiment improves the ability of the receiver to distinguish between the channels from the individual antennas. This is achieved by adapting the channel transfer functions of the individual antennas to reduce possible correlations between them by selecting particular feed points for the antennas.

In the embodiment described above, information is transmitted using binary phase shift keying (BPSK). Those of skill in the art will appreciate that other digital or analogue schemes can be employed.

Figure 6:
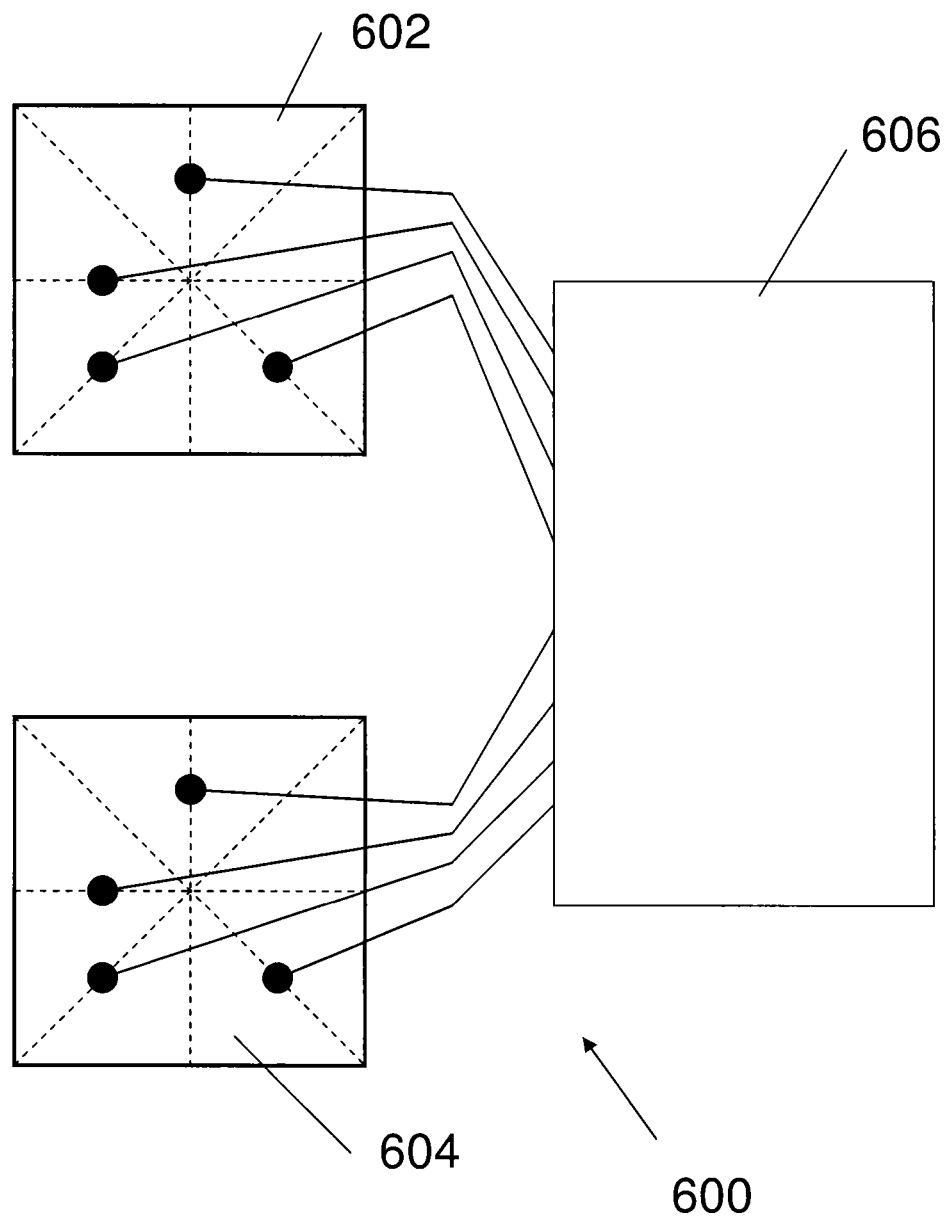
FIG. 6 shows a receiver according to an embodiment.

FIG. 6 shows a receiver 600 according to an embodiment of the present invention. The receiver 600 has two antennas 602 and 604. The two antennas 602 and 604 may be arranged in different directions so that different transmitting antennas can be distinguished by comparing the signals received on the two antennas. The two antennas 602 and 604 have a plurality of feed points. Each of the feed points is connected to a demodulator 606. The demodulator 606 compares the signals received from the feed points of antennas 602 and 604 and uses the received information to determine from which antenna of an array of antennas such as that shown in FIG. 1. Further, because the different feed points of antenna 602 and antenna 604 will respond differentially to different polarisations of incoming signal, the demodulator 606 uses the information from the different feed points to determine the polarisation of the incoming signal and therefore from which feed point the incoming signal was transmitted. Based on this information, the demodulator 606 can determine the information which was encoded on the selection of antenna and feed point by the transmitter.

In an alternative embodiment, the receiver is configured to decode information encoded on a signal using a maximum likelihood detector to determine the channel signature resulting from the chosen antenna and polarisation combination used at the transmitter. Such an embodiment would be advantageous in rich scattering environments, where polarisation is may be lost by the time the radio wave signal reaches the receiver due to the reflections, diffraction, and scattering. However, the fact that a particular polarisation was employed at the transmitter may induce a particular channel signature, i.e., a particular impulse/frequency response. This signature may differ from that obtained by employing a different polarisation at the transmitter. In an embodiment, the receiver may only have a single receive antenna and use the maximum likelihood detector to determine the channel signature resulting from the chosen polarisation/antenna combination used at the transmitter. Those of skill in the art will appreciate that the receiver could include more than one antenna for diversity purposes. Since information is encoded in the channel signature and only implicitly in the specific polarisation used, the receiver does not actually require knowledge of the polarisation to decode the transmitted message.

Figure 7:
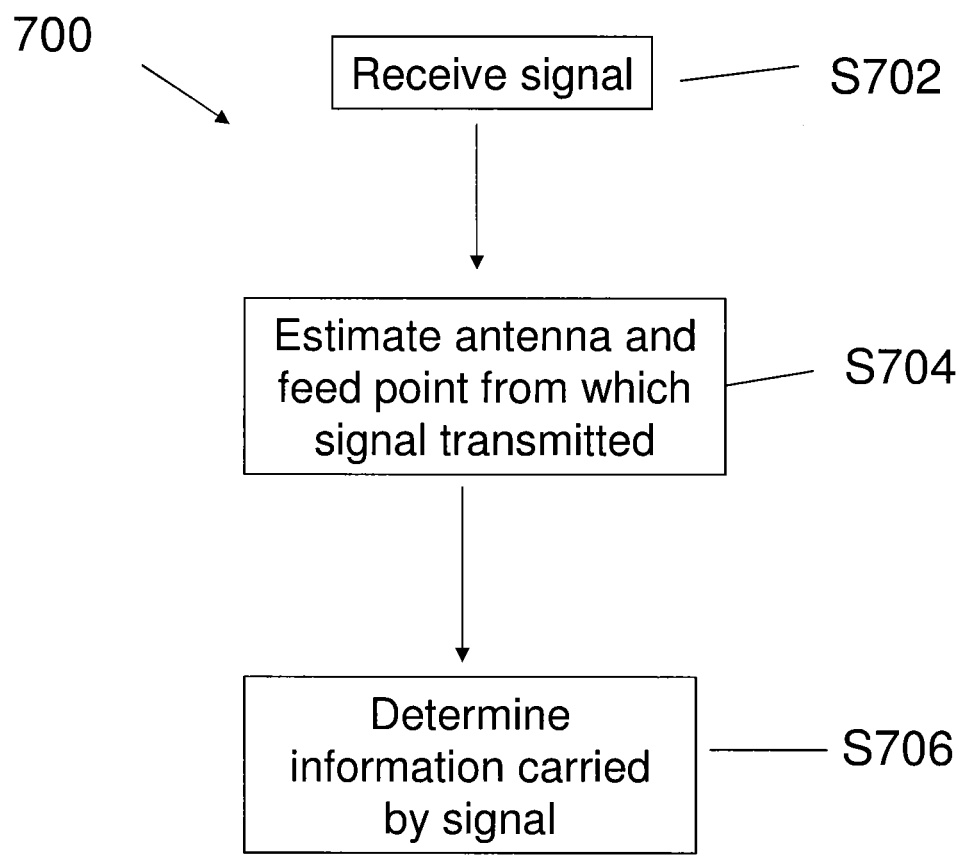
FIG. 7 shows a method of receiving a signal according to an embodiment.

FIG. 7 shows a method 700 of receiving information according to an embodiment. In step S702, a signal is received.

In step S704, the antenna and feed point from which the signal was transmitted is estimated. In step S706, using the estimated antenna and feed point, information carried by the signal is determined.

In an embodiment, a system comprises a transmitter as described above with reference to FIG. 5 and a receiver which is operable to determine which antenna from the plurality of antennas transmitted a signal.

As described above, in embodiments, spatial signalling schemes can be implemented in which the correlation between channel transfer functions of different radiating elements or radiating modes can be controlled and reduced. The performance of spatial signalling systems is largely dictated by this correlation and good performance requires channels to be sufficiently uncorrelated. Embodiments enable the reduction in this complexity by providing a method of implementing spatial signalling mechanisms using fewer physical antennas without incurring degradation in spectral efficiency (i.e., rate). Additionally, embodiments provide a way of monitoring system performance and adaptively updating the signalling scheme to achieve an improved performance In embodiments the antenna feed points are adaptively chosen using timely knowledge of system performance to improve in performance. In an embodiment, system performance information is attained by exploiting channel reciprocity. Such channel reciprocity exists, for example, in a time-division duplex (TDD) system, or by using a dedicated feedback channel in a frequency-division duplex (FDD) system. This information is monitored directly on a per-packet basis in packet switched networks for indications of poor performance, in which case different antenna feed points may be chosen either randomly or intelligently with the intent of reducing the correlation in the physical channel transfer functions corresponding to the used set of radiating elements, and thus improving performance.

Performance may be degraded due to the introduction of interference or degradation in the received signal strength. In an embodiment channel state information is monitored. From the channel state information correlation information can be directly measured and the antenna feed points can be chosen based on this. Finally, in uncorrelated scenarios where adequate performance is already achieved for any given antenna feed pattern, different polarisation modes might be chosen to improve robustness, a method akin to traditional antenna selection techniques where the transmit (or receive) antenna(s) that corresponds to the strongest channel is chosen for communication. In this case, instead of a physical antenna being selected, the polarisation mode can be selected.

By exploiting different antenna polarisation characteristics or similar radiating modes, a system designer may reduce the number of actual radiating elements and still achieve a target spectral efficiency. For example, a conventional space-shift keying system with 16 antennas, each operating in a single polarisation state, has a spectral efficiency of 4 bps/channel-use. However, one may design each antenna to be able to radiate in two polarisation states. In this case, 4 bps/channel-use can be achieved by only employing 8 antennas. Alternatively, the same spectral efficiency can be achieved by employing four antennas, each with four polarisation states.

It is envisaged that embodiments may make possible the use of spatial signalling schemes on smaller, handheld devices since the number of antennas may be reduced, thus reducing form factor.

While certain embodiments have been described, these embodiments have been presented by way of example only, and are not intended to limit the scope of the inventions. Indeed, the novel circuits described herein may be embodied in a variety of other forms; furthermore, various omissions, substitutions and changes may be made without departing from the spirit of the inventions. The accompanying claims and their equivalents are intended to cover such forms or modifications as would fall within the scope and spirit of the inventions.

The invention claimed is:

1. A method, in a wireless network, of transmitting a sequence of bits of information from an array of antennas, the array of antennas comprising a plurality of antennas, each antenna of the plurality of antennas having a plurality of feed points, the method comprising:

selecting an antenna to indicate at least part of the sequence of bits and selecting at least one feed point of the plurality of feed points for the selected antenna from a plurality of combinations of antenna and at least one feed point, the plurality of combinations of antenna and at least one feed point being determined such that a receiver can distinguish between channels defined by a selection of antenna from the plurality of antennas; and transmitting a signal from the selected antenna by driving the selected at least one feed point.

2. The method of claim 1, wherein driving the selected at least one feed point causes the antenna to transmit a signal having a characteristic channel signature.

3. The method of claim 1, wherein driving the selected at least one feed point causes the antenna to transmit a signal having a characteristic polarisation.

4. The method of claim 1, further comprising selecting the plurality of combinations of antenna and at least one feed point.

5. The method of claim 4, wherein the plurality of combinations of antenna and at least one feed point are selected based on channel state information.

6. The method of claim 4, further comprising receiving an indication of an error rate from a receiver and changing the plurality of combinations of antenna and at least one feed point.

7. The method of claim 6, further comprising determining from the indication of the error rate if there is a correlation between channel transfer functions for combinations of antenna and operating mode in the plurality of combinations of antenna and at least one feed point.

8. The method of claim 4, wherein the plurality of combinations of antenna and at least one feed point comprises a combination for each antenna, wherein the combination for each antenna comprises a single feed point, or a combination of feed points, for each antenna.

9. A method, in a wireless network, of transmitting a sequence of bits of information from an array of antennas, the array of antennas comprising a plurality of antennas, each antenna of the plurality of antennas having a plurality of feed points, wherein the sequence of bits of information comprises a first part and a second part, the method comprising:
selecting an antenna and at least one feed point of the plurality of feed points for the selected antenna from a plurality of combinations of antenna and at least one feed point to indicate the first part of the sequence of bits; and
transmitting a signal from the selected antenna by driving the selected at least one feed point, wherein the signal transmitted from the selected antenna using the at least one feed point depends on the second part of the sequence of bits.

10. A transmitter comprising:
an array of antennas, the array of antennas comprising a plurality of antennas, each antenna of the plurality of antennas having a plurality of feed points;
a selector configured to select an antenna and at least one feed point for the selected antenna;
a driver configured to drive the selected at least one feed point of the selected antenna with a drive signal; and
a modulator configured to control the selector such that the selected antenna indicates at least part of a sequence of bits to be transmitted and such that the combination of selected antenna and the selected at least one feed point allows a receiver to distinguish between channels defined by a selection of an antenna from the plurality of antennas.

11. The transmitter of claim 10, wherein the antennas of the plurality of antenna are patch antennas.

12. The transmitter of claim 10, wherein each antenna is configured such that driving a selected feed point or selected combination of feed points causes the antenna to generate an output signal having a characteristic polarisation.

13. A system comprising a transmitter and a receiver,
the transmitter comprising
an array of transmitter antennas, the array of transmitter antennas comprising a plurality of transmitter antennas, each transmitter antenna of the plurality of transmitter antennas having a plurality of feed points,
a selector configured to select a transmitter antenna and at least one feed point for the selected transmitter antenna;
a driver configured to drive the selected at least one feed point of the selected transmitter antenna with a drive signal; and
a modulator configured to control the selector such that the selected combination of transmitter antenna and at least one feed point indicates at least part of a sequence of bits to be transmitted,
the receiver comprising
at least one receiver antenna, the at least one receiver antenna configured to receive signals having a plurality of channel signatures, the plurality of channel signatures corresponding to different transmitter antennas of the array of transmitter antennas and different feed points of the transmitter antennas of the array of transmitter antennas; and
a demodulator configured to determine an indication of a transmitter antenna and feed point for a signal received and to use the indication of the transmitter antenna and the feed point to determine at least part of a sequence of bits transmitted from the array of transmitter antennas,
wherein the modulator of the transmitter is configured to select combinations of transmitter antenna and at least one feed point from a plurality of combinations, wherein the transmitter and the receiver are configured to dynamically determine the plurality of combinations to reduce correlations in channel signatures between the combinations of transmitter antenna and feed points in the plurality of combinations.

14. A non-transitory computer readable medium encoded with computer-readable instructions which when executed by a processor cause the processor to perform a method according to claim 1.

* * * * *